(12) United States Patent
Giunta et al.

(10) Patent No.: US 11,442,043 B2
(45) Date of Patent: Sep. 13, 2022

(54) SYSTEM AND METHOD OF REMOTE MONITORING OF THE INTEGRITY OF PRESSURIZED PIPES BY MEANS OF VIBROACOUSTIC SOURCES

(71) Applicant: ENI S.p.A., Rome (IT)

(72) Inventors: Giuseppe Giunta, San Donato Milanese (IT); Giancarlo Bernasconi, Malnate (IT); Massimo Signori, Gazzaniga (IT)

(73) Assignee: ENI S.p.A., Rome (IT)

( * ) Notice: Subject to any disclaimer, the term of this patent is extended or adjusted under 35 U.S.C. 154(b) by 191 days.

(21) Appl. No.: 16/763,142

(22) PCT Filed: Nov. 14, 2018

(86) PCT No.: PCT/EP2018/081245
§ 371 (c)(1),
(2) Date: May 11, 2020

(87) PCT Pub. No.: WO2019/096854
PCT Pub. Date: May 23, 2019

(65) Prior Publication Data
US 2020/0309741 A1 Oct. 1, 2020

(30) Foreign Application Priority Data
Nov. 15, 2017 (IT) .......................... 102017000130593

(51) Int. Cl.
*G01N 29/34* (2006.01)
*G01M 3/28* (2006.01)
(Continued)

(52) U.S. Cl.
CPC .......... *G01N 29/34* (2013.01); *G01M 3/2815* (2013.01); *G01N 29/07* (2013.01); *G01N 29/11* (2013.01);
(Continued)

(58) Field of Classification Search
CPC ........ G01N 29/34; G01N 29/07; G01N 29/11; G01N 2291/043; G01N 2291/2636;
(Continued)

(56) References Cited

U.S. PATENT DOCUMENTS 4,435,974 A * 3/1984 Fuchs ................. G01M 3/2807
73/40.5 A
5,708,193 A 1/1998 Ledeen et al.
(Continued)

FOREIGN PATENT DOCUMENTS

WO WO 2017/008098 A1 1/2017

OTHER PUBLICATIONS

International Search Report dated Jan. 31, 2019 in PCT/EP2018/081245 filed on Nov. 14, 2018.

*Primary Examiner* — Suman K Nath
(74) *Attorney, Agent, or Firm* — Oblon, McClelland, Maier & Neustadt, L.L.P.

(57) ABSTRACT

A monitoring system of the integrity of a pressurised pipe by at least one pressure pulses generator that is hydraulically connected to the fluid in the pipe. Each generator comprises: one first tank and a second tank that maintain the fluid respectively at a first and a second pressure values. The first value is smaller, and the second value is greater than the predefined pressure value of the fluid in the pipe. The first and second tanks generate respectively a negative pressure pulse, caused by the passage of the fluid from the pipe to the first tank, and a positive pressure pulse, caused by the passage of the fluid from the second tank to the pipe. A pressure transducer is designed to measure the pressure values of the fluid in the pipe and to convert the negative or positive pressure pulses generate by the generator into respective recorded acoustic signals. A measurement station is placed along the pipe to detect the acoustic signals.

10 Claims, 13 Drawing Sheets

(51) Int. Cl.
*G01N 29/07* (2006.01)
*G01N 29/11* (2006.01)

(52) U.S. Cl.
CPC .................. *G01N 2291/043* (2013.01); *G01N 2291/2636* (2013.01)

(58) Field of Classification Search
CPC ............. G01M 3/2815; G01M 3/2846; G01M 3/2861; G01M 5/0025; G01M 5/0066; G01M 3/24; G01M 3/03
See application file for complete search history.

(56) References Cited

U.S. PATENT DOCUMENTS

| | | | | |
|---|---|---|---|---|
| 6,194,902 | B1 * | 2/2001 | Kuo | ..................... G01N 17/00 324/637 |
| 6,472,883 | B1 * | 10/2002 | Burnett | .................. G01N 17/00 324/532 |
| 2018/0202612 | A1 | 7/2018 | Simpson et al. | |

* cited by examiner

SYSTEM AND METHOD OF REMOTE MONITORING OF THE INTEGRITY OF PRESSURIZED PIPES BY MEANS OF VIBROACOUSTIC SOURCES

The present invention relates to a system and to a method of remote monitoring of the integrity of pressurised pipes by means of vibroacoustic sources.

Activities of remote monitoring and of non-destructive inspection of pipes for the transportation of fluids are known. These monitoring activities can be carried out both when the pipes are in service, that is to say with flowing fluid, and when pumping is off and the pipes are packed. These monitoring activities are typically able to detect, locate and classify the following anomalies:

Obstructions and deposits of solid materials;
mechanical deformations and dents;
holes, breaks and lesions of the pipe;
leaks of fluid, also in hydraulic test conditions;
joints, variations in the internal diameter of the pipe;
other geometrical defects of the piping, including hydrogen blistering;
interface between different fluids;
operating conditions of the valves;
tracking of cleaning/inspection devices, the so-called pipeline inspection gauges (P.I.G.).

Currently the activities of monitoring of pipes for the transportation of fluids can be carried out via reflectometry techniques. Reflectometry techniques are based on the sending of non-destructive signals into an object to be analysed and on the analysis of the return signals in order to identify any anomaly in the medium traversed. In the case of pipes for the transportation of fluids, signals can be sent in the form of acoustic waves (acoustic pulse reflectometry). Each variation in the geometrical/elastic parameters of the fluid/pipe system generates a reflected signal which can be recorded and processed in order to identify the anomaly that has generated it.

Typically the reflected signals are generated by obstructions, deformations, holes, joints, cracks, leaks, variations in diameter and contact surfaces between different fluids (liquids, gases and mixtures). The capacity of exploration, in terms of maximum distance that can be reached and the type of the anomaly, is a function of the thermodynamic properties of the fluid and of the internal diameter of the pipe, and also of the frequency content of the analysis signal which is sent into the pipe. For example, for pressurised pipes for the transportation of hydrocarbons (with internal diameter comprised between approximately cm and approximately 1 m) the distance of exploration can reach tens of kilometres.

Some techniques of monitoring pipes use as analysis signal the acoustic noise normally present in the fluid transported, which is typically generated by the fluctuations in pressure due to the pumping system. Other monitoring techniques use instead active sources of acoustic signals which have the advantage (when this is possible) of being calibrated on a particular target, so as to maximise the sensibility of the system and of the method of monitoring with respect to a given anomaly. Moreover, the active sources of signals are suitable for the activities of periodic monitoring of the pipes, for example to identify the need to perform operations of cleaning/inspection by means of P.I.G.

The basic principles and the applications of acoustic pulse reflectometry techniques are described, for example, by:

Sharp, D. B., "*Acoustic pulse reflectometry: a review of the technique and some future possibilities*", Hong Kong, 2001;

Papadopoulou, K. A. et al., "*An evaluation of acoustic reflectometry for leakage and blockage detection*", Journal of Mechanical Engineering Science, 2008;

Yunus, U. et al., "*Detection of leak Location in a pipeline by acoustic signal*", IEICE Transactions on Fundamentals of Electronics, Communications and Computer Sciences, 2008;

Gong, J., Lambert, M. F., Zecchin, A. C., and Simpson, R., Experimental verification of pipeline frequency response extraction and leak detection using the inverse repeat signal; Journal of Hydraulic Research, 54(2), 2016.

Document WO 2008/075066 A2 describes a device for the identification of leaks in a water distribution network by means of the processing of pressure transients generated by the closure of the valves of this water distribution network.

Document EP 2817588 A1 describes a method for determining the properties of a pipe, in particular the position of a certain pipe branch in an effluent disposal network.

Document WO 2014/005126 A1 describes a method and an apparatus for identifying the working conditions of a pipe for the transportation of fluids. The acoustic analysis signal has a frequency comprised between approximately 10 kHz and approximately 150 kHz. The method and the apparatus are able to identify a layer or a deposit of material inside the pipe for the transportation of fluids, as well as identify a certain physical condition of this pipe for the transportation of fluids.

Document GB 2517411 A describes a method and an apparatus for defining in remote mode, in a reliable and accurate manner, the presence and the position of phenomena known as 'slacks' or 'slugs' in a pipe for the transportation of fluids.

Document US 2012/0312078 A1 illustrates a fixed apparatus connected to a pipe and configured to generate and transmit periodically acoustic signals inside this pipe. A mobile apparatus is instead inserted in the pipe and comprises either one or more sensors configured to measure the conditions of the pipe in the surroundings of the mobile apparatus while this mobile apparatus moves inside the pipe, and a unit of reception of the acoustic signals generated and transmitted by the fixed apparatus.

Document WO 2014/096019 A1 in the name of the same Applicant uses the pressure transients generated by the equipment for the regulation of the flow of fluid to obtain, in a pipe for the transportation of fluids, the parameters of propagation of the transients of pressure (speed of sound and attenuation) in the short and long term in order to identify and localise anomalies in the pipe.

Document EP 2944857 A1 in the name of the same Applicant describes a method of locating and of tracking of a P.I.G. device which moves inside a pipe. The method provides for the processing of the vibroacoustic signal generated by the P.I.G. device when it crosses the welding seams between the various sections of pipe.

Another system of monitoring (PRIMEFLO®) designed by the same Applicant is based on a totally non-invasive inspection technology, designed to create and analyse hydraulic transients in a pipe for the transportation of fluids. This technology allows rapid and effective localisation of complete or partial obstructions in wells or pipes, the identification of the presence and of the internal distribution of organic or inorganic deposits in wells or pipes for liquids (oil or water), the inspection of wells or pipes for the transportation of gas to determine the presence of accumulations of liquid, monitoring of the operations of internal inspection/cleaning by means of P.I.G., especially in the case of underwater lines, and the detection of the properties of the fluids transported.

Reflectometry techniques based on electromagnetic waves are also used in pipes. Documents U.S. Pat. No. 6,472,883 B1, U.S. Pat. No. 6,194,902 B1 and WO 2008/066904 A2 exploit the localised variations of the velocity of the pulses which propagate along a conductor element in order to identify anomalies, such as for example the surface corrosion of a pipe. Document U.S. Pat. No. 6,751,560 B1 illustrates a system and a method for the non-invasive inspection of pipes by means of electromagnetic waves.

In general, reflectometry techniques can be used for a medium/long term monitoring of pipes for pressurised fluids transportation, with a statistical and/or differential approach. In this case the acoustic response of the pipeline is measured when the fluid/pipe system is known to be free from anomalies, and then periodically checked by means of new acquisitions of data and comparison of these data with the reference ones. Moreover, when accurate instruments of numerical simulation are available, the reflectometry measurements can be inserted in procedures of inversion in order to obtain quantitative information on the physical properties of the fluid/pipe system. In all these situations it is important to have in-depth knowledge of the analysis signal to be sent into the pipe, as well as the ability to generate a required waveform of this signal, maximising the sensitivity of the monitoring technique with respect of a certain anomaly.

Usually the active sources of acoustic waves in liquid substances are constituted by discharge solenoid valves (on/off). As regards the gases, there are sources of so-called chirp signals, that is to say signals in which the frequency varies with time, increasing (up-chirp) or decreasing (down-chirp). In general, there are numerous apparatuses for the generation of acoustic waves adaptable to all types of fluids, although these apparatuses are not able to produce signals with waveforms which can be selected by the user.

The objective of the present invention is therefore that of realising a system and a method of remote monitoring of the integrity of pressurised pipes which are able to solve the limitations of the prior art mentioned above.

In detail, an objective of the present invention is that of realising a system and a method of remote monitoring of the integrity of pressurised pipes which, by means of devices generating controllable pressure transients, are able to produce signals with waveforms which can be selected by the user without producing leaks of fluid (liquid, gas or mixtures, such as for example $CO_2$ or $H_2S$) from the pipe.

This objective according to the present invention is achieved by making a system and a method of remote monitoring of the integrity of pressurised pipes as disclosed in the independent claims.

Further features of the invention are made clear by the dependent claims, which are an integral part of this description.

The features and the advantages of a system and a method of remote monitoring of the integrity of pressurised pipes according to the present invention will be made clearer by the following description, given by way of a non-limiting example and referred to the accompanying schematic drawings, in which.

Figure 1A:
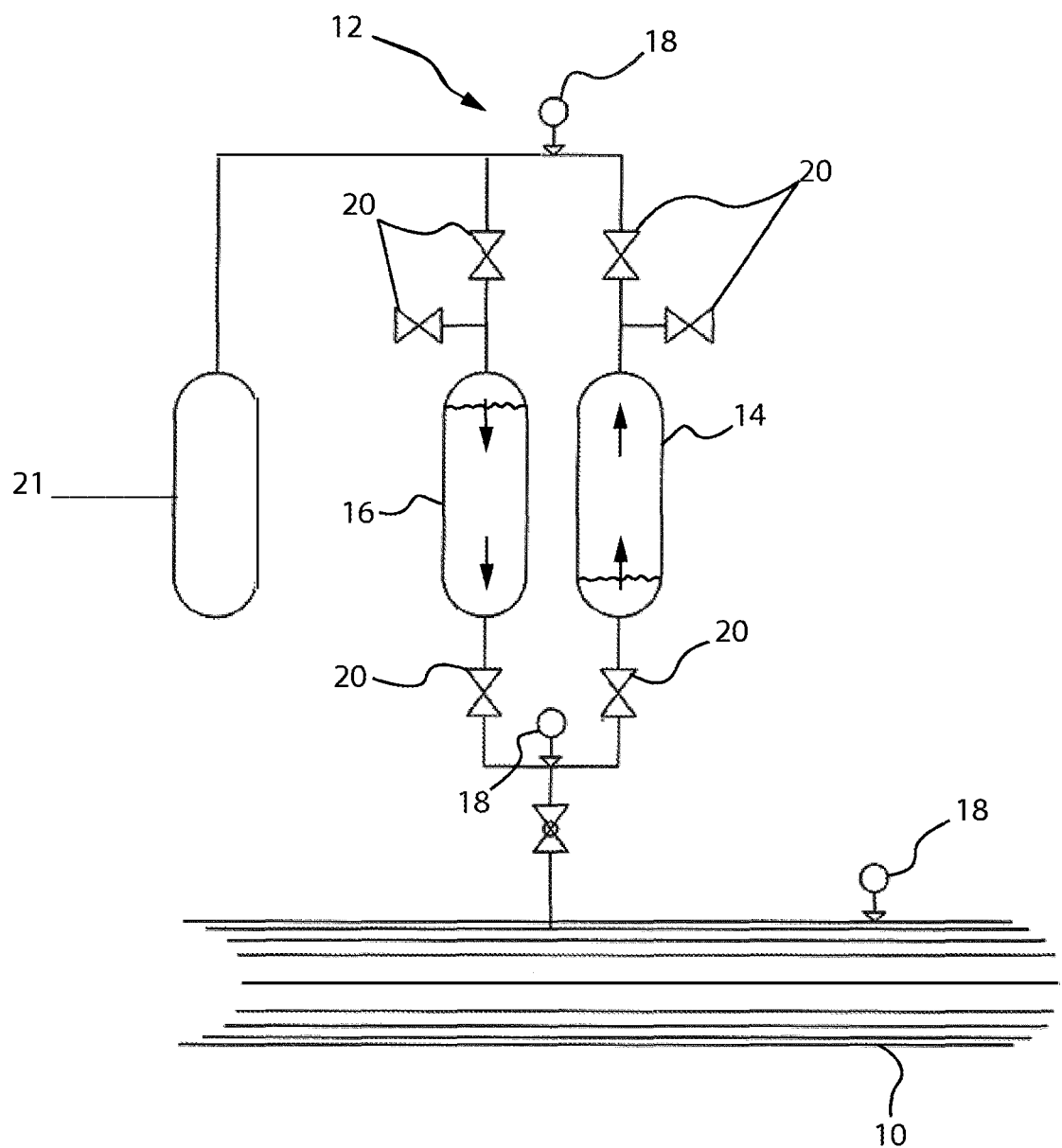
FIG. 1a is a schematic view of a device generating pressure pulses belonging to the system of remote monitoring of the integrity of pressurised pipes according to the present invention.
Figure 1B:
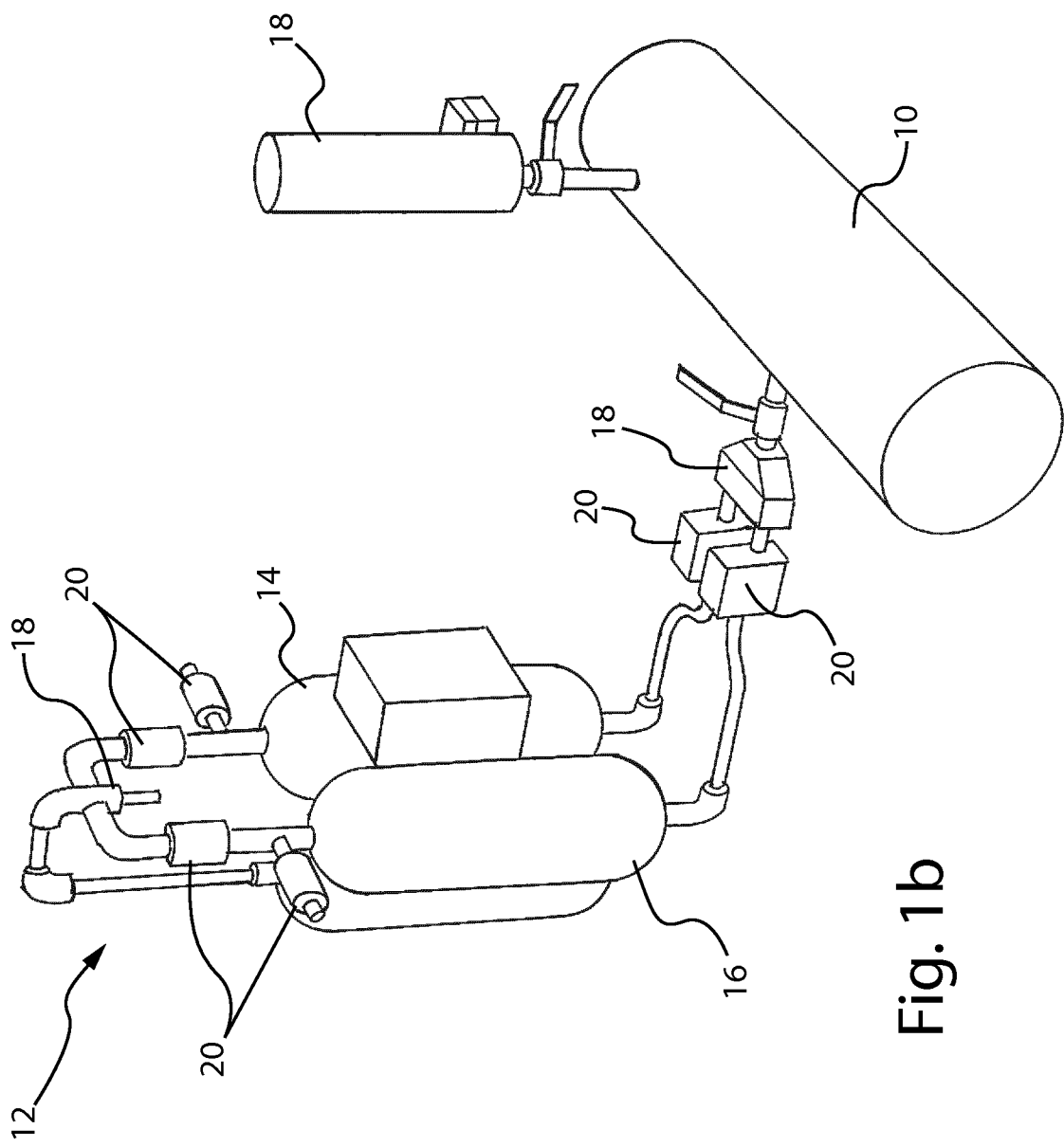
FIG. 1b is a perspective view of the pressure pulses generator device.

Referring in particular to FIG. 1, a system of remote monitoring of the integrity of pressurised pipes according to the present invention is shown. The system of monitoring is applicable to a generic pipe 10 for the transportation of a fluid at a predefined pressure value P. The fluid can be constituted by a liquid, a gas or a liquid/gas mixture.

The monitoring system comprises at least one pressure pulses generator device 12, hydraulically connected to the fluid transported by the pipe 10. Each pressure pulses generator device 12 comprises at least one first tank 14, designed to contain a first predefined quantity of fluid coming from the pipe 10 and to maintain this first predefined quantity of fluid at a first pressure value $P_1$ which is lower than the predefined pressure value P of the fluid transported by the pipe 10. Each pressure pulses generator device 12 comprises therefore at least one second tank 16, designed to contain a second predefined quantity of fluid coming from the pipe 10 and in order to maintain this second predefined quantity of fluid at a second pressure value $P_2$ which is greater than the predefined pressure value P of the fluid transported by the pipe 10. Auxiliary tank 21 allows to reuse tanks (14 and 16).

The first low-pressure tank 14 and the second high-pressure tank 16 generate respectively a negative pressure pulse, caused by the passage of fluid from the pipe 10 to the first tank 14, and a positive pressure pulse, caused by the passage of fluid from the second tank 16 to the pipe 10. Each pressure pulses generator device 12 comprises moreover at least one pressure transducer 18, designed to detect the pressure values of the fluid and to convert these pressure values into respective signals s(t), and a plurality of solenoid valves 20, designed to control the movements of the fluid from the pipe 10 to the pressure pulses generator device 12 and vice versa.

Each pressure pulses generator device 12 operates therefore as binary and active source of controllable pressure pulses of opposite sign, for any type of fluid (liquids, gases and mixtures), with the following special features:

- possibility of generating binary and/or multi-level sequences of negative and positive pressure pulses in a manner that can be selected by the user and so as to exploit advanced techniques of coding for the purpose of incrementing the signal/noise ratio and the detectability of the acoustic signals s(t);
- reuse of the tanks: when the first tank 14 is filled with fluid, it is brought to high pressure, so as to be able to inject fluid into the pipe 10. Simultaneously, the pressure of the fluid in the second tank 16 is reduced and this second tank 16 becomes the low-pressure tank which aspirates fluid from the pipe 10. This technical solution prevents any contact between the fluid transported by the pipe 10, and the surrounding environment, in order to make the acoustic signals generator device completely watertight;
- negligible perturbation of the hydraulic balance inside the pipe 10, balancing the negative and positive pressure pulses, with zero average value, so as not to alter the static conditions of the fluid in the pipe and the relative acoustic propagation constants.

Advantageously the pulses generator device 12 can produce binary waveforms with negative and positive pulses, with the advantage of being able to use advanced coding schemes of the source wave in order to increase the signal/noise ratio and the sensitivity for detecting the anomalies.

The source does not alter the hydraulic balance of the fluid/pipe system in static conditions, balancing negative and positive pulses. The system of monitoring of a pipe is "closed" and does not produce any release of fluid into the environment. Moreover, by using simultaneously several source devices 12 equipped with discharge/charge solenoid valves, a discrete number of amplitudes of the pressure pulses is obtained, even greater than two, extending the range of the sequence of the acoustic signals to multi-level codes.

The system of monitoring comprises at least one measurement station 22 or 24 (FIG. 2), placed along the pipe and provided with one or more vibroacoustic sensors configured to detect the acoustic signals $s_A(t)$ or $s_B(t)$ received from one or more pressure pulses generator devices 12. Preferably, the system of monitoring comprises at least one pair of measurement stations 22 and 24 placed at a predefined distance along the pipe 10. Each measurement station 22 and 24 is provided with respective vibroacoustic sensors configured to record the acoustic signal $s_A(t)$ and $s_B(t)$. Direct arrival at each measurement station 22 and 24, of the acoustic signal emitted by the pressure pulses generator devices 12, is used to calculate the velocity of propagation (speed of sound) and the equivalent acoustic transfer function of section A-B of pipe 10 comprised between the measurement stations 22 and 24.

The pipe 10 behaves like a waveguide for the pressure transients (acoustic waves) which propagate inside the pressurised fluid transported by the same pipe 10. A discrete network of vibroacoustic sensors, such as for example pressure, hydrophone, accelerometer sensors, etc. belonging to respective measurement stations 22 and 24 positioned along the pipe 10, records both the acoustic waves directly generated by the pressure pulses generator devices 12 and the acoustic waves possibly generated by anomalies that occur along the pipe 10.

Figure 2:
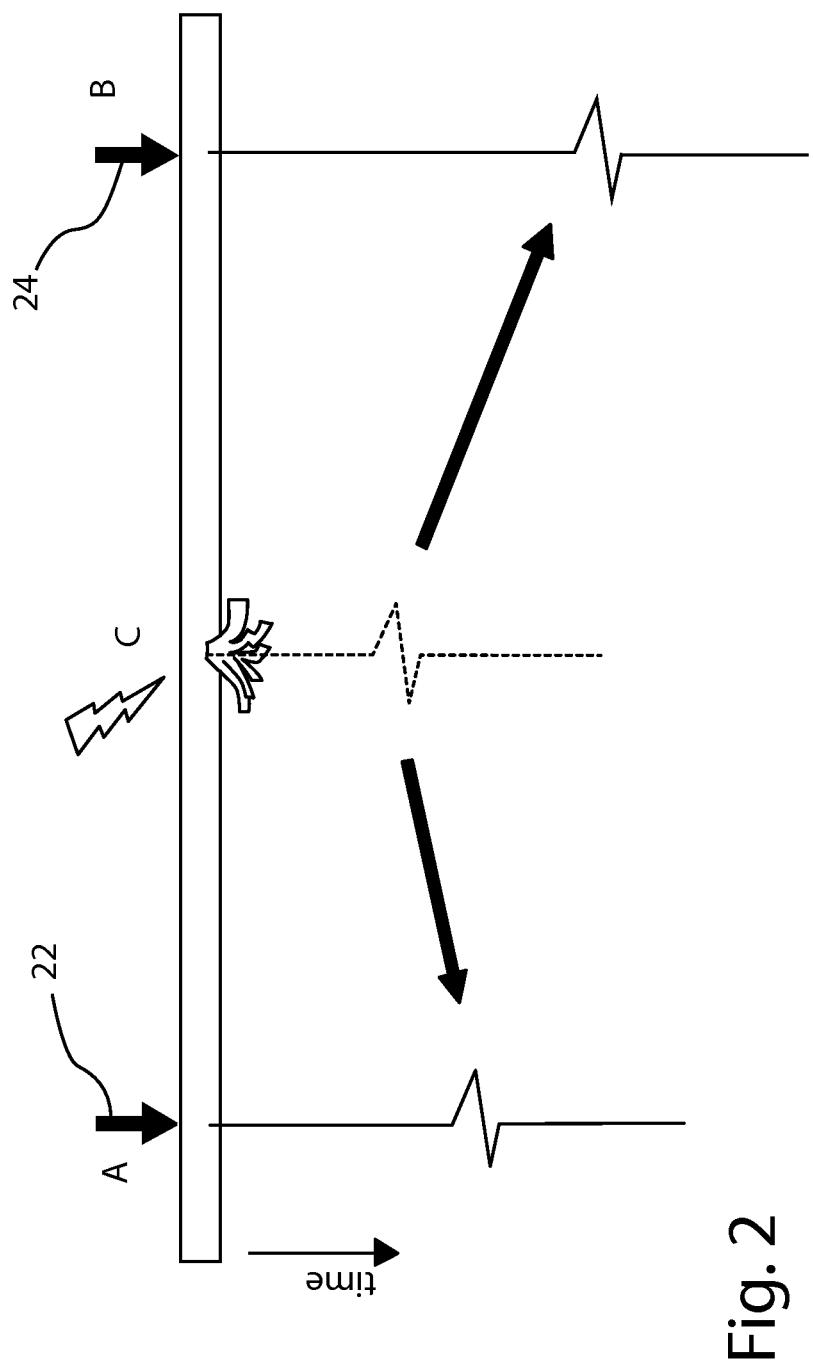
FIG. 2 is a representation, as a function of time, of a waveform generated by a perturbation induced in an intermediate point C of a section of pipe A-B.

As shown in FIG. 2 and as described in the document WO 2014/096019 A1 in the name of the same Applicant, pairs of adjacent measurement stations 22 and 24, positioned respectively in points A and B of the pipe 10, are used to measure the effective parameters of propagation (speed of sound and attenuation) in order to perform accurate standard reflectometry reconstructions, such as for example triangulations of the times of arrival of a same waveform in the acoustic signals $s_A(t)$ and $s_B(t)$. The data are processed by a centralised processing unit of the monitoring system.

The basic principle of the processing of the data is the one whereby, in the pipe 10, fluctuations of the pumping regimes, regulations of the flow at the valves and the presence of active generators of pressure are primary sources of pressure transients, generally at the terminal ends of the pipe 10. On the other hand, along the pipe 10, other noises (pressure variations) are also generated. Some examples of these noises are constituted by mechanical activities performed near the pipe 10, which transmit vibrations to this pipe 10, and/or by the scattering of the acoustic signals in transit in the pipe 10, in correspondence to localised reductions in diameter, pipe joints, branches, etc. These "secondary sources" which reflect the acoustic signals in transit in the piping can be activated by means of the use of the pressure pulses generator devices 12.

The method of remote monitoring of the integrity of pressurised pipes according to the present invention is based on the following assumptions:

- the pipe 10 is divided and analysed in a plurality of sections A-B, wherein each section A-B of pipe 10 is comprised between pairs of adjacent measurement stations 22 and 24;
- the signals measured in A and in B, respectively $s_A(t)$ and $s_B(t)$, are used to compute an acoustic energy emitted/scattered from a discrete set of point along the section A-B of pipe 10, rather than being processed for their instantaneous amplitude;
- if a section A-B of pipe 10 contains a point of scattering of the acoustic signals in transit, the relative "signature" is contained in the recordings of these acoustic signals $s_A(t)$ and $s_B(t)$ performed by the measurement stations 22 and 24. The "signature" is a lagged and attenuated version of the original waveform introduced by the pressure pulses generator devices 12;
- it is hypothesised that the speed of sound v, and the coefficient of absorption a inside the pipe 10 are known and/or can be derived by means of numerical simulators. As described in the document WO 2014/096019 A1 in the name of the same Applicant, the parameters of propagation are estimated continuously, in such a way that they can be directly used by the method of monitoring.

On the other hand, the acoustic signals that propagate directly from the pressure pulses generator devices 12 and the measurement stations 22 and 24 can also be used in order to estimate the parameters of propagation;

$s_A(t)$ and $s_B(t)$ indicate the acoustic signals recorded by the measurement stations 22 and 24 respectively at the points A and B of the section A-B of pipe 10, where (t) is time;

$S_A(f)$ and $S_B(f)$ indicate the Fourier transforms respectively of the acoustic signal $s_A(t)$ and of the acoustic signal $s_B(t)$, where (f) is the frequency of these signals;

$H_{AB}(f)$ indicates the transfer function of the pressure transient which is propagated from point A to point B of the section A-B of pipe 10;

v indicates the speed of the sound inside the fluid which flows in pipe 10 from point A to point B of the respective section A-B of pipe 10;

$$\hat{S}_{CA}(f) = \frac{|x_A - x_C|/|x_A - x_B|}{|H_{AB}|} S_A(f) e^{j2\pi f |x_B - x_C|/v}$$

is the Fourier transform of the estimated signal which is generated in an intermediate point C (FIG. 2) of the section A-B of pipe 10 by means of back propagation of the acoustic signal $s_A(t)$ measured in the point A;

$\hat{s}_{CA}(t)$ is the inverse Fourier transform of $\hat{S}_{CA}(f)$;

$$\hat{S}_{CB}(f) = \frac{|x_B - x_C|/|x_A - x_B|}{|H_{AB}|} S_B(f) e^{j2\pi f |x_B - x_C|/v}$$

is the Fourier transform of the estimated signal which is generated in an intermediate point C (FIG. 2) of the section A-B of pipe 10 by means of back propagation of the acoustic signal $s_B(t)$ measured in the point B;

$\hat{s}_{CB}(t)$ is the inverse Fourier transform of $\hat{S}_{CB}(f)$;

$E_C(x,t) = \int [\int_{t_1}^{t_2} \hat{s}_{CA}(\tau) \cdot \hat{s}_{CB}(t-\tau) d\tau] dt$ is the integral at a generic position x (the generic intermediate point C of FIG. 2) along the pipe 10, of the cross-correlation of a time window from $t_1$ to $t_2$ of $\hat{s}_{CA}(t)$ and $\hat{s}_{CB}(t)$.

Figure 3:
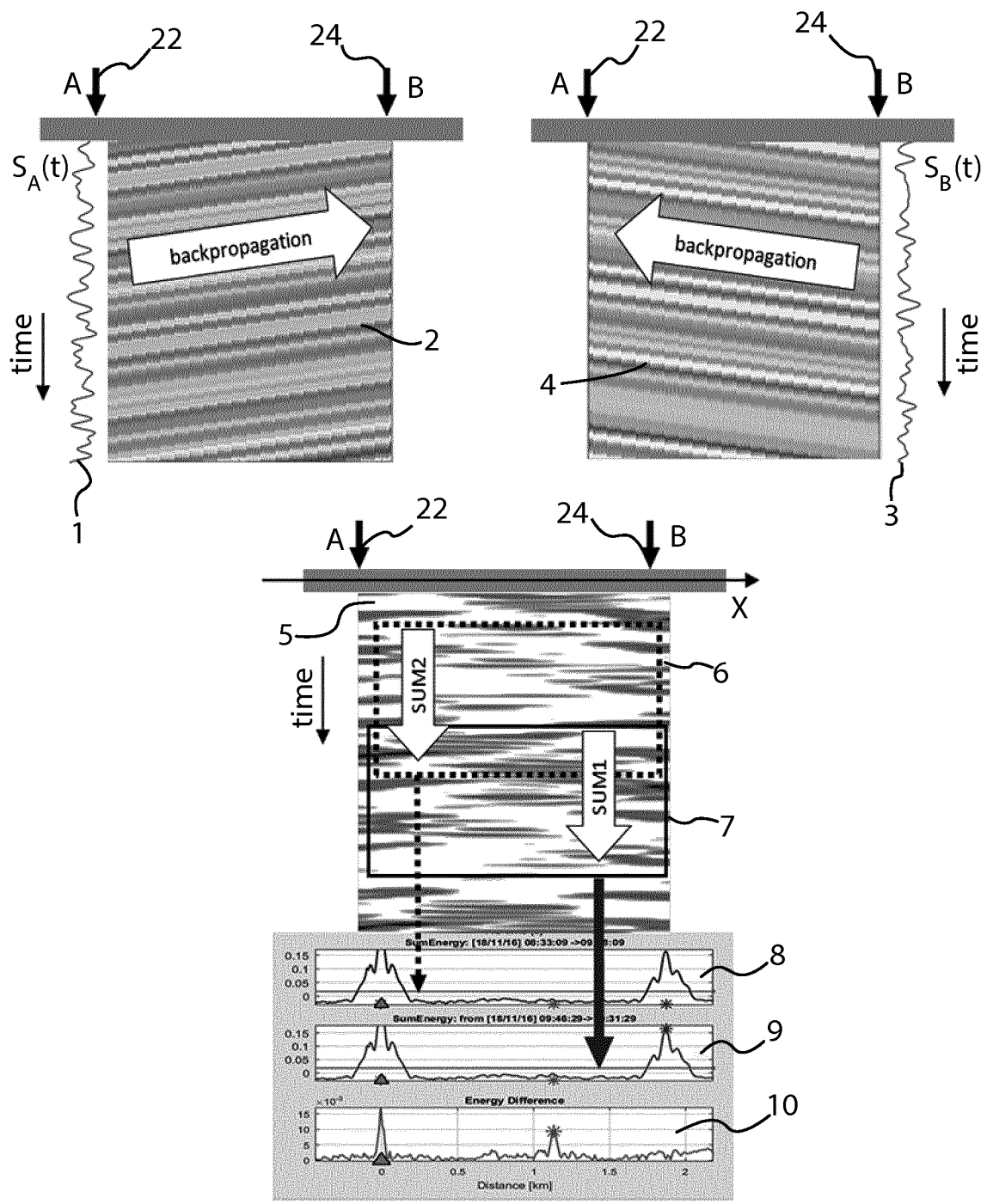
FIG. 3 is a flow diagram of the method of remote monitoring of the integrity of pressurised pipes according to the present invention.

The method of remote monitoring of the integrity of pressurised pipes according to the present invention comprises therefore the following steps:

generation of one or more acoustic signals s(t) by one or more respective pressure pulses generator devices 12;

reception, by two adjacent measurement stations 22 and 24 positioned respectively in points A and B of pipe 10, of the acoustic signals $s_A(t)$ and $s_B(t)$;

filtering, with a band-pass filter and with bandwidth W, of the acoustic signals $s_A(t)$ and $s_B(t)$, so as to maintain these acoustic signals $s_A(t)$ and $s_B(t)$ in a predefined range of frequencies, useful for obtaining the energy of these acoustic signals $s_A(t)$ and $s_B(t)$. On the acoustic signals $s_A(t)$ and $s_B(t)$ procedures of adapted filtering and of deconvolution can be applied, as well as algorithms of adaptive reduction of the noise, on the basis of the direction of arrival of these signals;

the acoustic signals $s_A(t)$ and $s_B(t)$ are back-propagated respectively from point A to point B and from point B to point A of the section A-B of pipe 10 on a discrete set of points along this section A-B of pipe 10 (FIG. 3). The distance between the adjacent points obtained in this way represents substantially the expected resolution. The back-propagation operation compensates the propagation, and it is performed using the inverse of the equivalent acoustic transfer function of the section A-B of pipe 10, which is calculated using the acoustic signals $s_A(t)$ and $s_B(t)$, for example processing the direct arrivals from the acoustic sources to the measurement stations 22 and 24;

for each point along the section A-B, a cross-correlation is performed on a moving time window between the back-propagated acoustic signals $s_A(t)$ and $s_B(t)$, for the purpose of highlighting a potential coherence. Ideally, an acoustic signal originated from one point in the set of points analysed and propagated to point A and to point B is correctly "equalized" in the phase of back-propagation. The cross-correlation simply extracts the respective energy value therefrom. In a "silent" point of the pipe 10, in fact, normally no appreciable signal is detected, obtaining as a result a negligible energy value. The time duration of the moving cross-correlation window can be adapted to the period of activity of the pressure pulses generator devices 12;

for each point of the set the integral is evaluated as a function of a discretized time, obtaining then a matrix of energy values. The coordinates of the matrix are the positions of the points of the pipe section between A and B, and the time of computation of the energy. The set of the energy values integrated as a function of the time forms a map versus time and position along the pipe on which possible anomalies of the pipe 10 are represented by peaks of said energy values.

A threshold criterion on the energy value is applied in order to trigger a possible alarm signal. The threshold value needs to be set following a phase of calibration of the system. Moreover, since the distribution of the energy along the pipe 10 can be different, due to different working conditions of the same pipe, a phase of training of the system is also necessary. The integration of the energy is performed on a limited time window and then restarted, as a function of the time length of the waveforms produced by the pressure generator devices 12 (for example from a period of time comprised between tens of minutes and a few hours), in order to avoid effects of masking or of polarization on future events.

The energy computed from the acoustic signals $s_A(t)$ and $s_B(t)$ can also be used with a differential approach, that is to say subtracting from the current energy value an estimated energy value in a reference scenario.

In this process thorough knowledge of the original waveform is fundamental, in order to perform a reliable procedure of deconvolution and adaptive subtraction.

The set of the integrated energy values as a function of time and space forms a map on which possible anomalies of the pipe 10, such as for example deformations, pipe joins, branches, etc., are represented by peaks of these energy values. The method of monitoring can also be applied to one single acoustic signal, for example $s_A(t)$, recorded during the utilization of a single pulse generator device 12. The acoustic signal $s_A(t)$ is auto-correlated after a time variant compensation of the propagation, as in a procedure of adapted filtering. The result is back-propagated and then integrated as a function of time. Possibly the distribution of the energy along the pipe 10 can be compared, in a differential manner, with the same distribution of a reference scenario.

The method of monitoring based on the calculation of the energy of the acoustic signals can also be applied for the identification of external interferences on the pipe 10, or of any other activity able to produce vibroacoustic signals in a certain position along this pipe 10. In these cases there is no need to make use of active sources of noise, as the pressure transients are generated by the interactions with the pipe 10.

Figure 4:
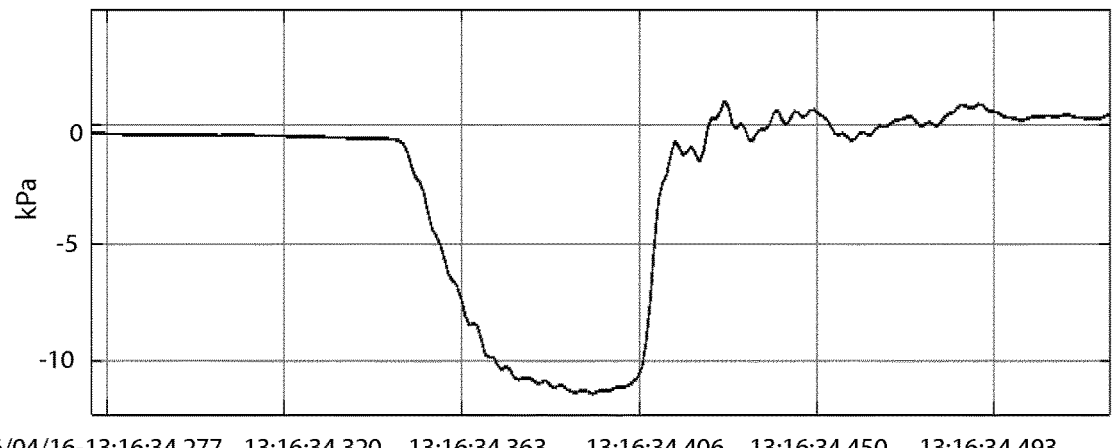
FIG. 4 is a diagram of the pressure pulses generated by a fluid sent to the low-pressure tank of the pulses generator device of FIG. 1.
Figure 5:
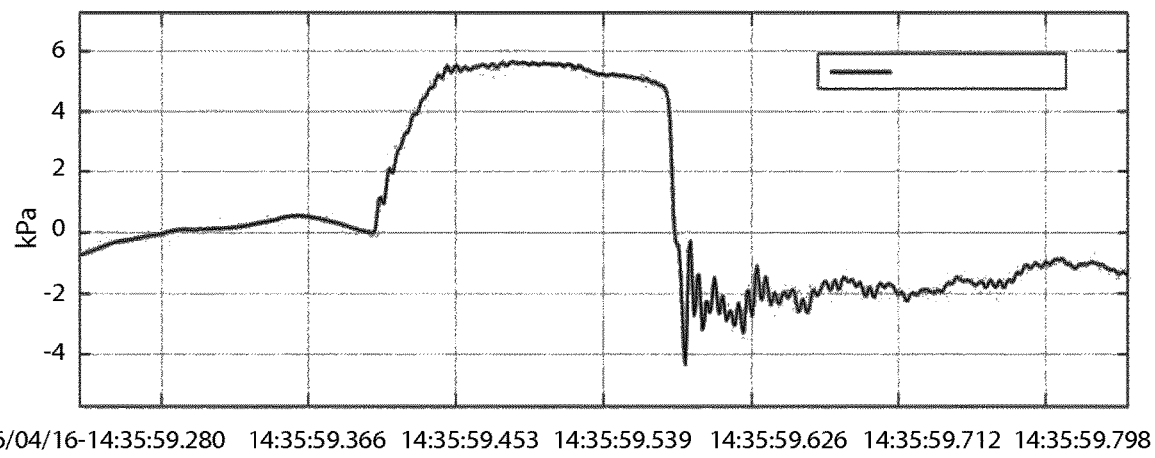
FIG. 5 is a diagram of the pressure pulse generated by a fluid expelled from the high-pressure tank of the pulses generator device of FIG. 1.

FIGS. 4 and 5 show respectively diagrams of the pressure pulse in an example of application of the system and of the method of remote monitoring of the integrity of pressurised pipes according to the present invention. The pressure pulses generator device 12, provided with the two tanks 14 and 16, is used to generate a negative pressure pulse (FIG. 4) and a positive pressure pulse (FIG. 5) in the pipe 10. These pressure pulses can be controlled as regards both the time duration, and the amplitude of pressure. Binary coding of these pressure pulses can be performed (for example with spread-spectrum transmission techniques, LABS: low autocorrelation binary sequences or Golay sequences) and/or a multi-level modulation (for example m-PAM: multilevel pulse-amplitude modulation).

Figure 6:
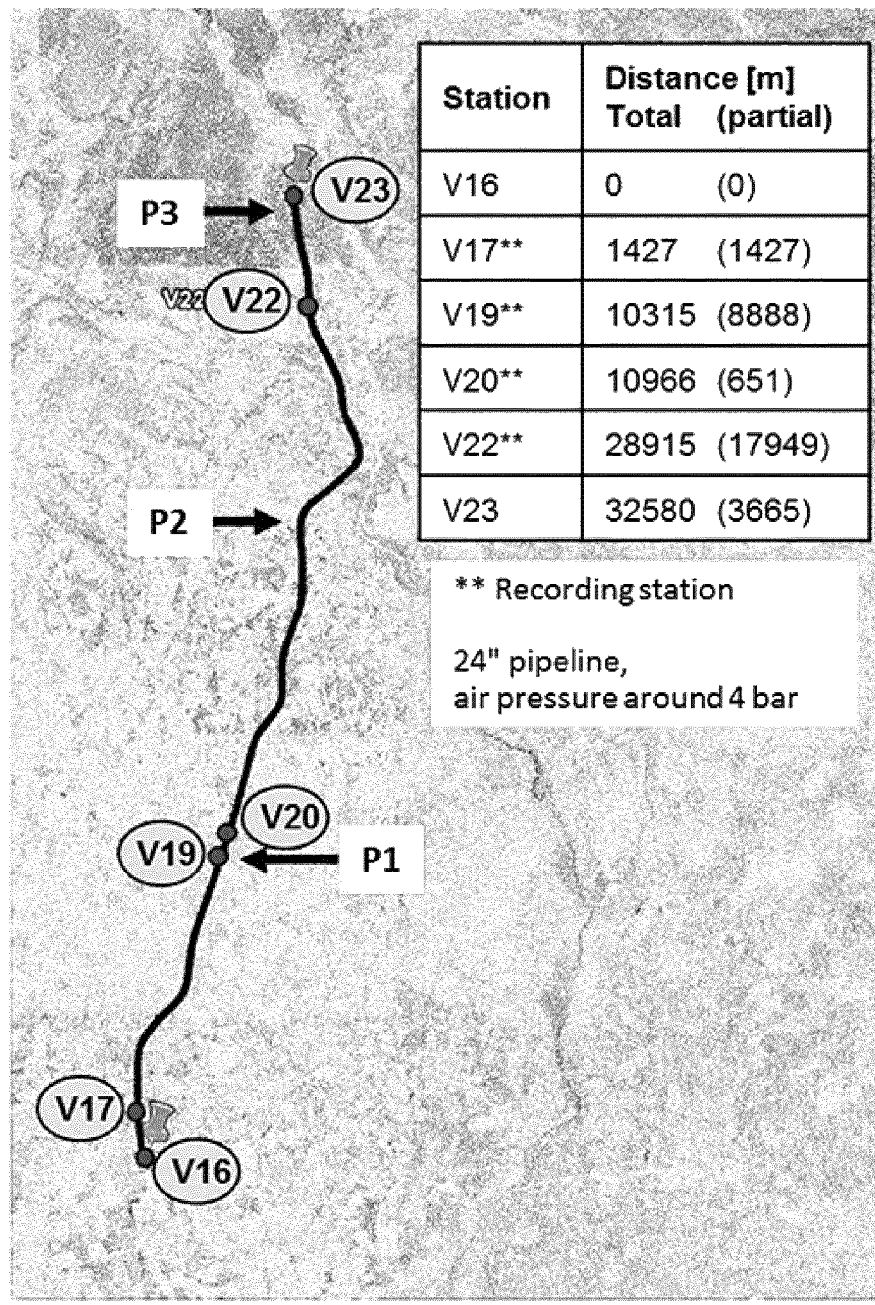
FIG. 6 shows a generic pressurised pipe for the transportation of fluids to which the system and the method of monitoring according to the present invention can be applied.

FIG. 6 shows the application of the system and of the method of monitoring according to the present invention to a section V16-V23, 33 km long, of a pipe with internal diameter equal to 24" for pressurised gas transportation. Along the section V16-V23 four stations of generation and of recording of vibroacoustic signals are installed, denoted respectively by V17, V19, V20 and V22.

Figure 7:
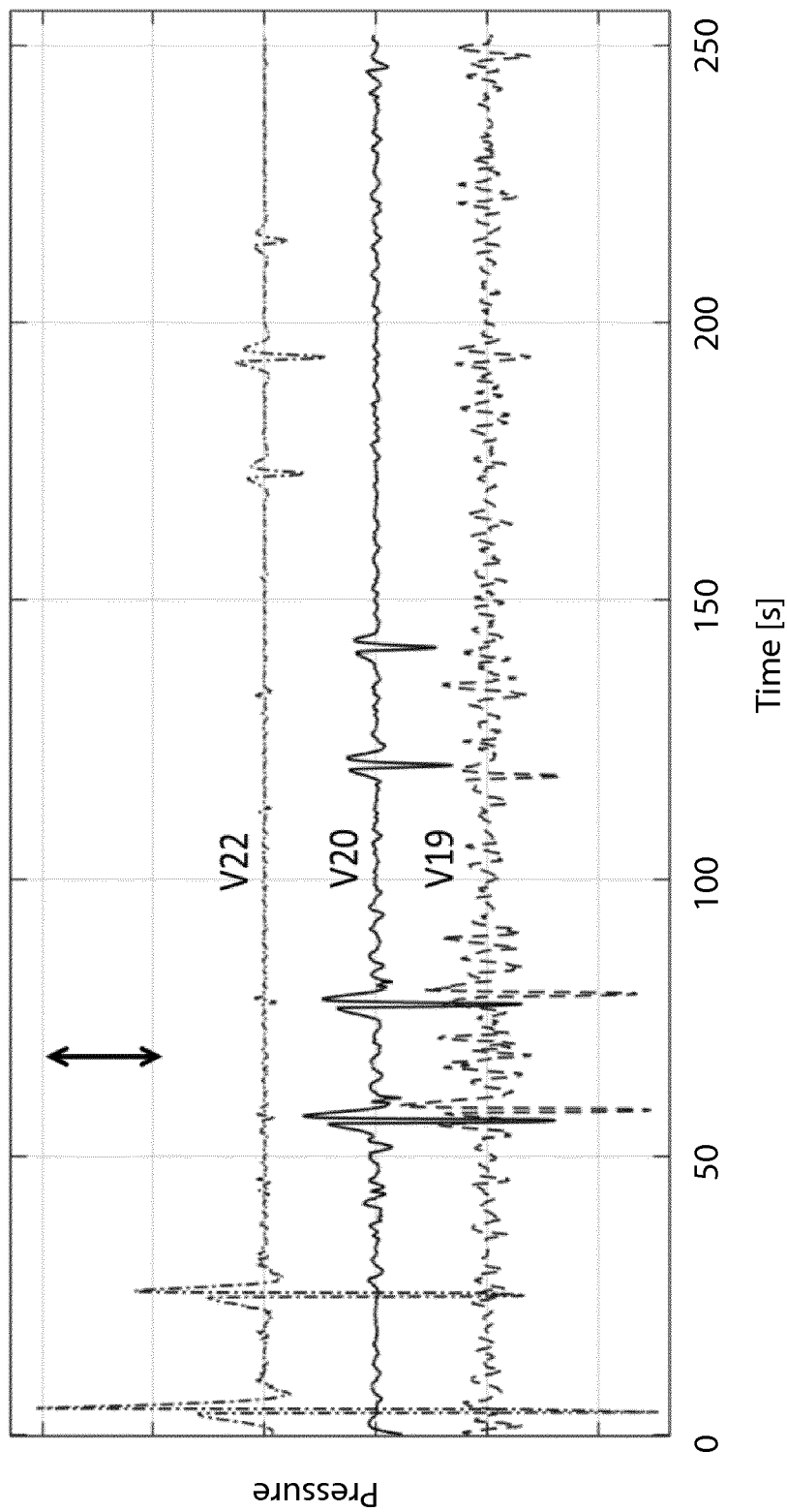
FIG. 7 is a diagram of the pressure transient which occurs in points V22, V20 and V19 of the pipe of FIG. 6 in conditions of discharge of fluid in a pressure pulses generator device placed in the point V22 of the pipe of FIG. 6.

At the station V22 a short negative pressure pulse is generated. FIG. 7 shows the pressure signals measured at the three stations V19, V20 and V22. The original signal (V22) is distinctly visible at a time of around 5 seconds and is followed, at a time of around 25 seconds, by the reflected echo from an occlusion of the section V16-V23 of pipe at a valve in the point V23. The acoustic wave generated by the pressure pulse at the station V22 is also recorded by the other stations V19 and V20 and the respective pressure signals are shown in FIG. 7.

Figure 8:
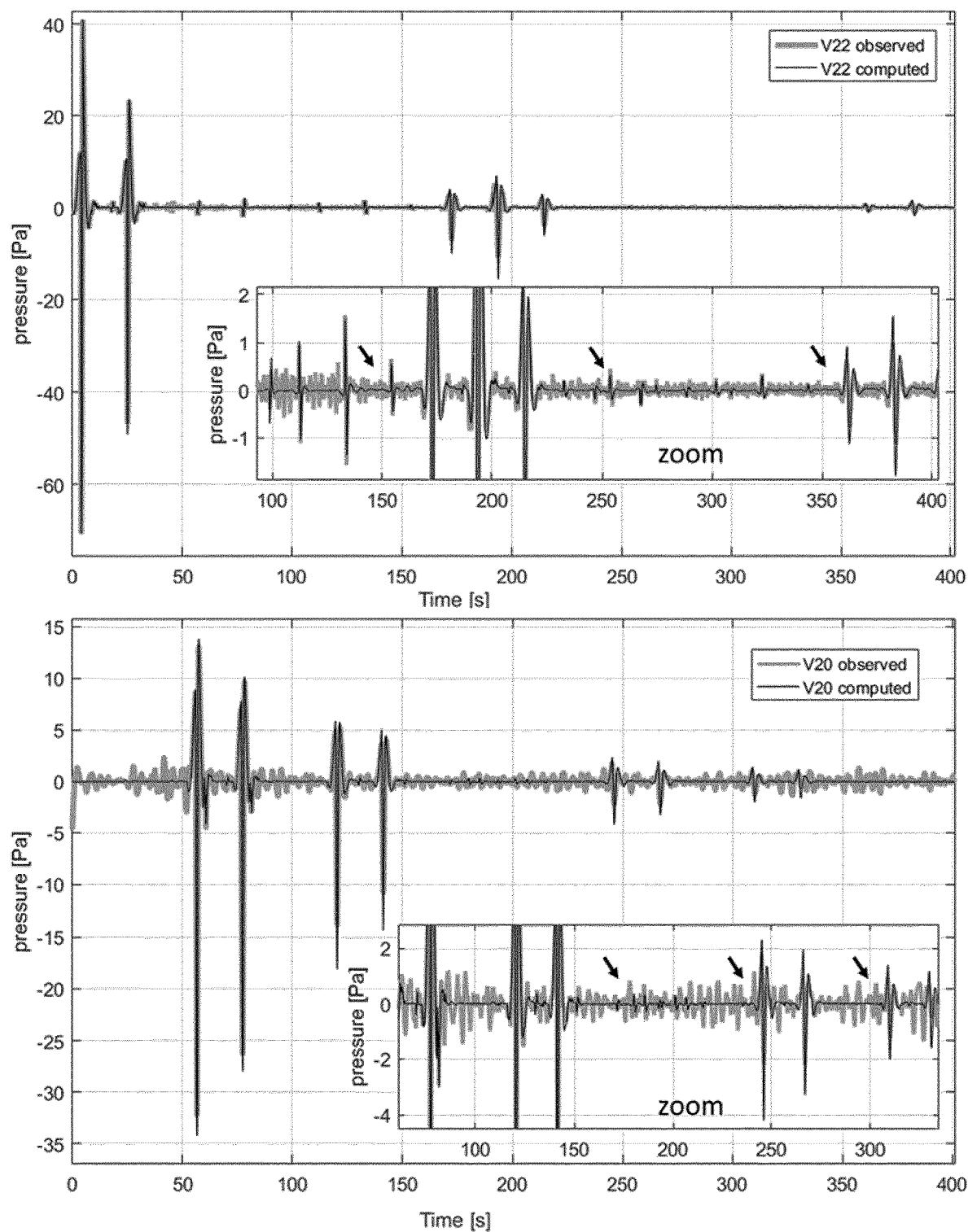
FIG. 8 is a diagram that shows, as a function of time, the acoustic signals s(t) measured and processed at the points V20 (above) and V22 (below) of the pipe of FIG. 6.

FIG. 8 shows some smaller reflections (indicated by the arrows in the enlarged square) which should not occur in a pipe with constant cross section (diameter). The overall acoustic response has then be feeded to an iterative inversion procedure. The section V16-V23 of pipe has been parameterised as a sequence of pipe segments with unknown cross section (diameter). Starting from a model with constant cross section (diameter), a simulator has computed the correspondent synthetic acoustic response, which has been compared with the real measurements. The model has been updated in an iterative manner, until the residual between the pressure signals calculated and those effectively measured is below a predefined threshold. The final inverted model has highlighted the following anomalies in the section V16-V23 of pipe:

the north terminal of the section V16-V23 of pipe is located around 50 m downstream of the valve V23. A site inspection has revealed that the pipe was closed with a welded closure in this buried portion;

an anomaly P1 was identified at 10315 m distance from the point V16. This anomaly produced a negative reflection (increase in the equivalent cross section). The position of the anomaly P1 coincides with the point V19 and the anomalous reflection was attributed to a blind branch of the pipe;

another anomaly P2 was identified at a distance of 19815 m from the point V16, while a further anomaly P3 was identified at a distance of 31305 m from the point V16. These anomalies, which cannot be inspected, were attributed to buried deformations of the pipe.

Figure 9:
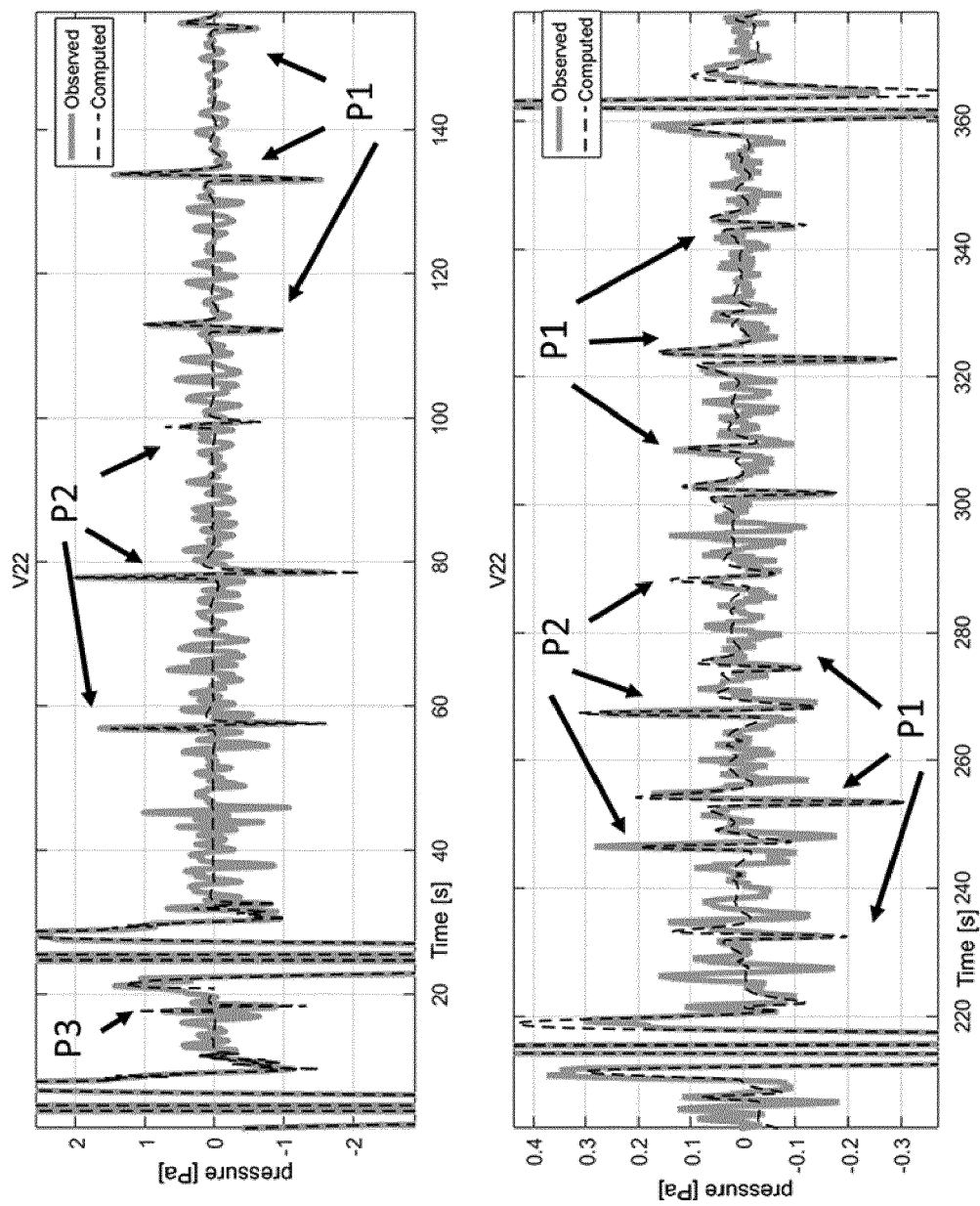
FIG. 9 is a diagram that shows, in an enlarged view, the acoustic signals s(t) measured and processed at the point V22 of the pipe of FIG. 6.

The equivalent final model explains also correctly the smaller echoes, like the higher order multiples (FIG. 9). It is important to note that the simulator has to model all the effects of propagation, including the attenuation and the dispersion, which are functions of the frequency.

Figure 10:
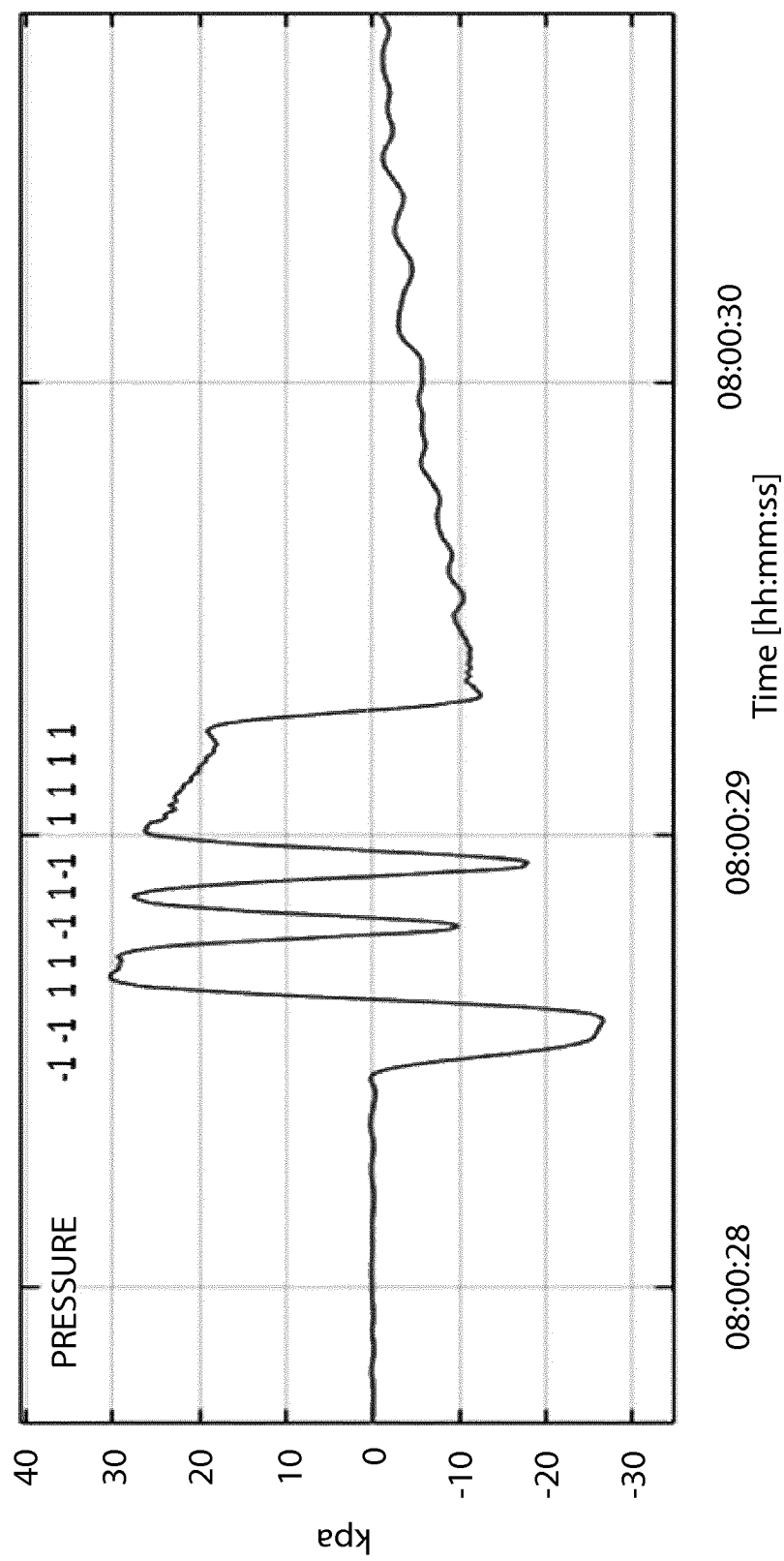
FIG. 10 is a diagram that shows the pressure transients, coded in binary code, of an example of application of the system and of the method of monitoring according to the present invention.

FIG. 10 shows the pressure transients, coded in binary code, of another example of application of the system and of the method of monitoring according to the present invention.

In this example of application a reflectometry campaign was performed on a pipe 1896 m long and with internal diameter equal to 12". The pipe was filled with water at a pressure of 5 bar.

Figure 11:
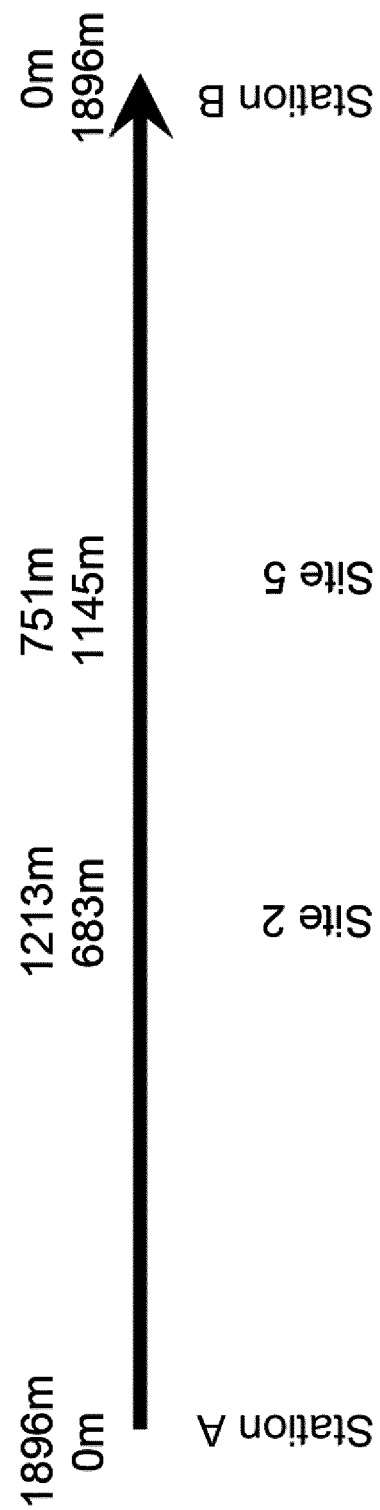
FIG. 11 is a schematic representation of a pipe on which monitoring tests have been performed, obtaining the values of FIG. 10.

The pipe, shown schematically in FIG. 11, is closed at both ends. At a first end (station A) a pressure pulses generator device 12 is placed which generates a binary sequence of pressure transients of the "low autocorrelation binary sequence" type or "LABS". The relative diagram is shown in FIG. 10.

The pipe has two anomalous situations, shown schematically in FIG. 11:

a valve is partially closed at the point "Site 5";

a short branch with a closed end (20 m in length with internal diameter equal to ¼") is connected to the pipe at the point "Site 2". No discharge of water occurs at this branch.

Figure 12:
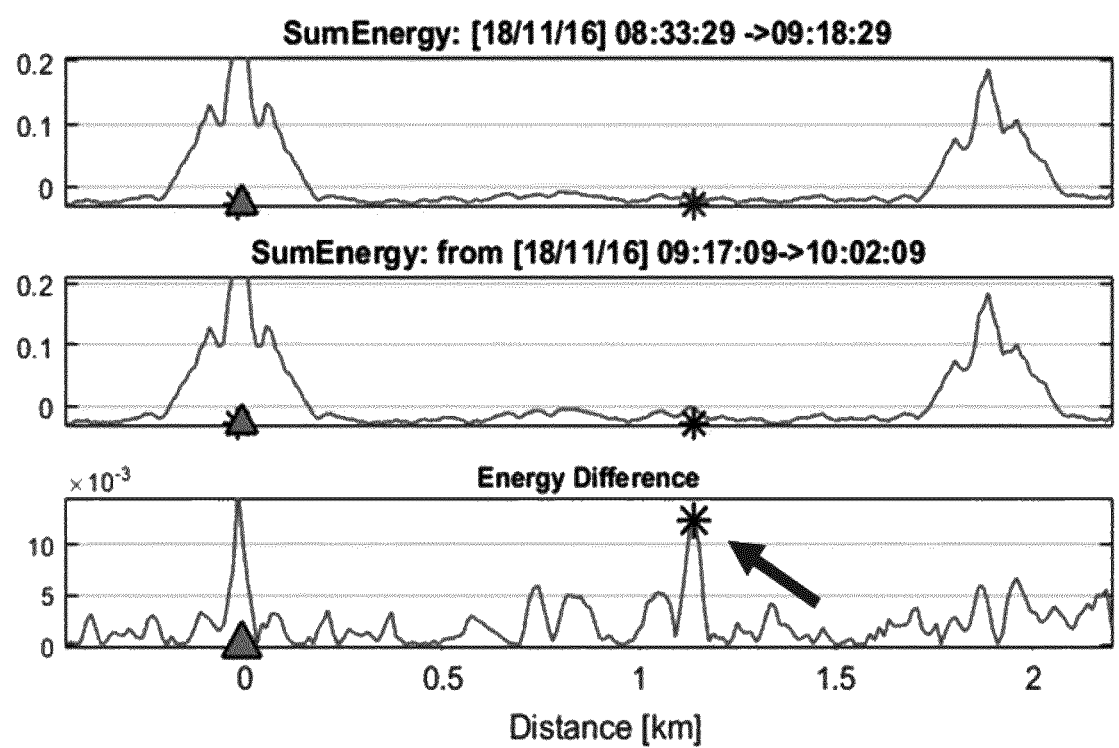
FIG. 12 is a diagram that shows a first series of energy values obtained from the example of application of the system and of the method of monitoring as shown in FIGS. 10 and 11.

FIG. 12 shows the results in terms of energy values, of the reflectometry campaign performed on the pipe of FIG. 11 in the point "Site 5". The results were obtained by computing the difference between 40 minutes of data recorded in reference conditions, that is to say with the valve at "Site 5" open, and 40 minutes of data recorded in "anomalous" conditions, that is to say with the valve 50% closed. The differential energy peak at the point "Site 5", placed at a distance of 1145 m from the station A, is correlated to an energy scattering effect at the partial closure of the pipe.

In a spectrogram, with range of frequencies 0-250 Hz, of the acoustic signal recorded at the station A of the pipe it is possible to detect the variation of the equivalent acoustic channel of the pipe by comparing the condition prior to the actuation of the valve, with the condition after the partial closure of the valve. Vertical bands with high energy value correspond to the activation of the pressure sources. The sudden activation of the discharge/inlet valves and the use of sequences in binary code permits to increase the bandwidth of the signal.

Figure 13:
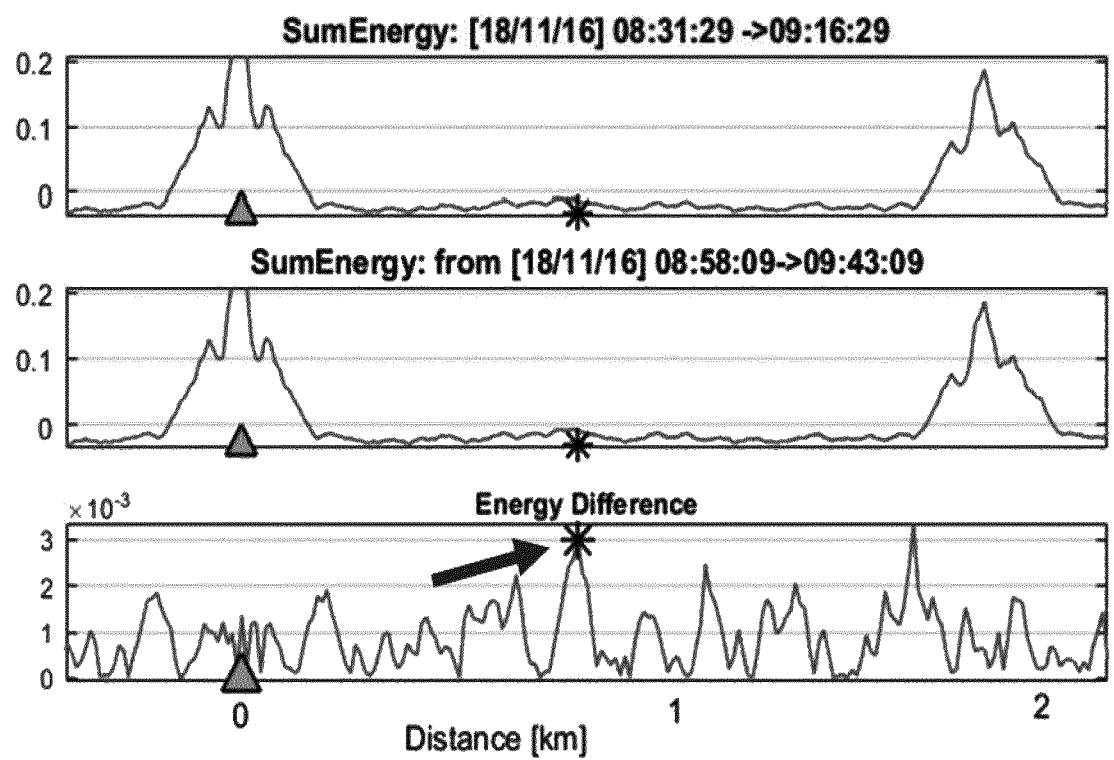
FIG. 13 is a diagram that shows a series of energy values obtained from the example of application of the system and of the method of monitoring as shown in FIGS. 10 and 11.

FIG. 13 shows the results, in terms of energy values, of the reflectometry campaign performed on the pipe of FIG. 11 to detect the anomaly in the point "Site 2". The results were obtained by making the difference between 40 minutes of data recorded in reference conditions, that is to say with the branch disconnected from the pipe, and 40 minutes of data recorded in "anomalous" conditions, that is to say with the branch connected to the pipe. The peak at the point "Site 2", placed at a distance of 680 m from the station A, is correlated to an energy scattering at the connection with the branch.

It was thus seen that the system and the method of remote monitoring of the integrity of pressurised pipes according to the present invention achieve the objectives disclosed previously.

The system and the method of remote monitoring of the integrity of pressurised pipes of the present invention designed in this way can in any case undergo numerous changes and variants, all coming within the same inventive concept. The sphere of protection of the invention is therefore defined by the appended claims.

The invention claimed is:

1. A system of monitoring a pipe for the transportation of a fluid at a predefined pressure value (P), the system comprising:

at least one pressure pulses generator device hydraulically connected to the fluid transported by the pipe, wherein each pressure pulses generator device comprises:

at least one first tank designed to contain a first predefined quantity of fluid coming from the pipe and designed to maintain the first predefined quantity of fluid at a first pressure value (P1) which is smaller than the predefined pressure value (P) of the fluid transported by the pipe;

at least one second tank designed to contain a predefined quantity of fluid coming from the pipe and designed to maintain the second predefined quantity of fluid at a second pressure value (P2) which is greater than the predefined pressure value (P) of the fluid transported by the pipe, wherein the first tank and the second tank generate respectively a negative pressure pulse, caused by the passage of fluid from the pipe to the first tank, and a positive pressure pulse, caused by the passage of fluid from the second tank to the pipe; and at least one transducer interposed between the pipe and the first and second tanks, the at least one transducer comprises a pressure transducer and a plurality of solenoid valves designed to control movement of the fluid in the pipe to the first tank and the second tank, the at least one transducer is designed to measure the first and second pressure values of the fluid in the first tank and the second tank, and the at least one transducer is designed to control the plurality of solenoid valves to generate the first and second pressure pulses to code the first pressure pulse and the second pressure pulse into recorded acoustic signals (s(t)), and at least one measurement station placed along the pipe and provided with one or more vibroacoustic sensors configured to record acoustic signals (sA(t), sB(t)) generated by the at least one pressure pulses generator device.

2. The system according to claim 1, further comprising at least one pair of measurement stations placed at a predefined distance along the pipe.

3. The system according to claim 1, further comprising a centralised processing unit configured to process data coming from the at least one pressure pulses generator device and the at least one measurement station.

4. The system according to claim 1, wherein each pressure pulses generator device further comprises an auxiliary tank and an auxiliary transducer, the auxiliary transducer comprising an additional pressure transducer and an additional plurality of solenoid valves designed to control the pressure of the fluid in the first and second tanks in order to reuse the first tank and the second tank for generating cycles of positive and negative pressure pulses.

5. A method of monitoring a pipe using the system of claim 1, the method comprising:

generating at least one acoustic signal by the at least one pressure pulses generator device;

receiving by at least one measurement station the at least one acoustic signal;

filtering the at least one acoustic signal to produce at least one filtered acoustic signal maintained in a predefined range of frequencies;

back propagating the at least one filtered acoustic signal on a corresponding set of points along the pipe to produce at least one back-propagated acoustic signal;

performing, for each point of the set, a cross correlation on a moving time window on the at least one back-propagated acoustic signal in order to extract an energy value therefrom;

producing, for each point of the set, an integral as a function of time of the energy value obtained in the phase of cross correlation to make a set of the energy values integrated as a function of time; and applying a threshold criterion to trigger a possible alarm signal, wherein the set of the energy values integrated as a function of time forms a map versus time and position along the pipe on which possible anomalies of the pipe are represented by peaks of the energy values.

6. The method according to claim 5, wherein two distinct acoustic signals ($s_A(t)$, $s_B(t)$) are recorded by two measurement stations after an activation of at least one pressure pulses generator device, the two distinct acoustic signals ($s_A(t)$, $s_B(t)$) being received by two adjacent measurement stations positioned respectively at opposite ends A and B of a section (A-B) of the pipe of a predefined length.

7. The method according to claim 6, wherein the two distinct acoustic signals ($s_A(t)$, $s_B(t)$) are back-propagated respectively from point A to point B, and from point B to point A, of the section (A-B) of the pipe on a corresponding set of points along the section (A-B) of the pipe.

8. The method according to claim 6, wherein the integral as a function of time of the energy value, at a generic position (x) along the section (A-B) of the pipe, is:

$$E_C(x,t) = \int [\int_{t1}^{t2} \hat{s}_{CA}(\tau) \cdot \hat{s}_{CB}(t-\tau) d\tau] dt$$

wherein:

$$\hat{S}_{CA}(f) = \frac{|x_A - x_C|/|x_A - x_H|}{|H_{A8}|} S_A(f) e^{j2\pi f |x_A - x_C|/v}$$

is the Fourier transform of a first estimated signal which is generated in said generic position (x) by back propagating the acoustic signal ($s_A(t)$) measured at the point A;

$S_A(f)$ is the Fourier transform of the acoustic signal $s_A(t)$, where (f) is the frequency;

$\hat{S}_{CA}(t)$ is the inverse Fourier transform of $\hat{S}_{cA}(f)$;

$$\hat{S}_{CB}(f) = \frac{|x_{A8} - x_C|/|x_A - x_8|}{|H_{AB}|} S_B(f) e^{j2\pi f |x_B - x_C|/v}$$

is the Fourier transform of a second estimated signal which is generated in said generic position (x) by back propagating the acoustic signal ($s_B(t)$) measured at the point B;

$S_B(f)$ is the Fourier transform of the acoustic signal $s_B(t)$, where (f) is the frequency;

$\hat{S}_{CB}(t)$ is the inverse Fourier transform of $\hat{S}_{CB}(f)$;

$H_{AB}(f)$ is the transfer function for pressure transients which are propagated from point A to point B of said section (A-B) of the pipe; and v is the speed of sound inside a fluid flowing from point A to point B of the section (A-B) of the pipe.

9. The method according to claim 5, wherein on the at least one acoustic signal, at least one procedure is applied on the basis of the direction of arrival of the at least one acoustic signal, the at least one procedure being selected from the group consisting of:

adapted filtering;
deconvolution; and
adaptive reduction of noise.

10. The method according to claim 5, further comprising calibrating the system in order to set a threshold value in order to apply the threshold criterion.

* * * * *